(12) United States Patent
Stowe

(10) Patent No.: US 7,077,102 B1
(45) Date of Patent: Jul. 18, 2006

(54) DUAL INLET PORT FOR INTERNAL COMBUSTION ENGINE

(76) Inventor: John K. Stowe, 229 Oxford St., Hartford, CT (US) 06105-2219

( * ) Notice: Subject to any disclaimer, the term of this patent is extended or adjusted under 35 U.S.C. 154(b) by 0 days.

(21) Appl. No.: 11/037,706

(22) Filed: Jan. 17, 2005

(51) Int. Cl.
F02B 31/00 (2006.01)

(52) U.S. Cl. ...................... 123/306; 123/308

(58) Field of Classification Search ........... 123/306, 123/308, 432
See application file for complete search history.

(56) References Cited

U.S. PATENT DOCUMENTS

| | | | |
|---|---|---|---|
| 3,868,940 A * | 3/1975 | Kirchweger | 123/188.14 |
| 4,450,793 A * | 5/1984 | Sumiyoshi et al. | 123/184.39 |
| 4,469,063 A | 9/1984 | Sugiura et al. | |
| 4,481,922 A * | 11/1984 | Sugiura | 123/306 |
| 4,574,751 A * | 3/1986 | Sugiyama et al. | 123/188.14 |
| 4,850,317 A | 7/1989 | Katsumoto et al. | |
| 5,277,160 A | 1/1994 | Choma et al. | |
| 5,309,880 A | 5/1994 | Mazzella et al. | |
| 5,323,753 A | 6/1994 | Cikanek, Jr. et al. | |
| 5,632,244 A | 5/1997 | Endres et al. | |
| 5,669,347 A | 9/1997 | Cullen et al. | |
| 5,718,198 A | 2/1998 | Adamisin et al. | |
| 5,740,778 A | 4/1998 | Corcoran et al. | |
| 5,873,341 A | 2/1999 | Smith, Jr. et al. | |
| 5,915,354 A | 6/1999 | Ma | |
| 6,039,019 A | 3/2000 | Breidenbach | |
| 6,250,281 B1 | 6/2001 | Takii et al. | |
| 6,550,447 B1 * | 4/2003 | Stutz et al. | 123/308 |
| 2002/0112693 A1 * | 8/2002 | Stutz et al. | 123/308 |

* cited by examiner

Primary Examiner—John T. Kwon
(74) Attorney, Agent, or Firm—Kenneth F. Dusyn; Law offices of Kenneth F. Dusyn

(57) ABSTRACT

A system (10) and method for the induction of a fluid into the combustion chamber (15) of an internal combustion engine comprising a cylinder head (12) having at least one intake port (14) communicating with at least one combustion chamber (15) via a valve seat (22) disposed about the intake port (14), and at least one intake valve (16) provided with a valve head (20) having a valve face (21) engageable with the valve seat (22). The valve head (20) is connected to an elongate valve stem (18) that is mounted in the cylinder head (12) for controlling the intermittent flow of fluid from the intake port (14) to the combustion chamber (15). The system also includes first and second flow passages (30,32) that tangentially converge with the intake port (14) about the valve stem (18), preferably at the same acute angle relative to the valve stem and from substantially opposite directions, for setting in motion a balanced and complementary swirl of the fluid about the valve stem (18) in a clockwise or counterclockwise direction through intake port (14) towards combustion chamber (15).

38 Claims, 5 Drawing Sheets

DUAL INLET PORT FOR INTERNAL COMBUSTION ENGINE

BACKGROUND OF THE INVENTION

1. Field of the Invention

The invention relates to a system for improving fuel flow in internal combustion engines, and more particularly to a system and method for the induction of a fluid in an internal combustion engine that enhances valve cylinder filling and scavenging to provide for improved charge stratification and efficient combustion.

2. Background

Obstacles to the efficient flow of fluid to the combustion chambers of internal combustion engines exist in even the best of current inlet porting systems. Generally, a fluid, such as a fuel/air mixture, that is introduced into an intake port must navigate around the valve stem of the intake valve before the fuel/air mixture enters the combustion chamber. Because the valve stem asserts itself in the middle of the fluid stream, vortices and fluid disruptions present themselves and serve as obstacles for impeding the flow of the fluid through the intake port. In addition, the fluid stream must redirect itself around the back face of the valve in order to fill the combustion chamber. Since the intake port is necessarily disposed at an angle to the valve and its valve stem in conventional engines, the back face of the valve will always deflect the fluid stream to one side of the intake port thereby rendering the opposite side of the intake port inaccessible as flow of fluid enters the combustion chamber. This problem is especially acute at lower valve openings, for example, in the critical overlap period that exists when combustion residuals from the previous combustion cycle are being swept out by incoming fluid flow. Inefficient mixing of fuel and air leads to incomplete or inefficient combustion in the engine's combustion chamber.

3. Related Art

Various intake systems in multi-cylinder combustion engines have employed the use of dual inlet ports for controlling the passage of a fuel-air mixture to the combustion chamber. U.S. Pat. No. 4,469,063 issued Sep. 4, 1984 to Sugiura et al. discloses a complete inlet manifold and port system specifically designed for carbureted engines and for engines utilizing a single inlet valve. As illustrated in FIGS. 1 and 2, the intake port structure consists of a primary passage 18 that interfaces with the side wall of a secondary passage 20 in tangential relation to the combustion chamber, and is angled downwardly at a small acute angle relative to the plane of the intake valve seat 14. In order for the secondary passage to create a helical swirling motion of the fuel-air mixture in the combustion chamber, a flow deflector wall 22 is provided in the cylinder head which extends into the secondary passage 20 above and upstream of the intake valve 6. The resulting cross-flow and collision of the fuel-air mixture from each of the primary and secondary intake passages, and hence the destruction of the swirling effect, is avoided by providing a groove 26 in the inner surface 22u of secondary passage 20 which extends from the first outlet port 18b to the flow deflector wall 22 at a point adjacent to the valve seat 14. However, this design deliberately crosses the high-velocity, small (primary) inlet port, fuel-air mixture stream with that of the larger (secondary) inlet port so that the high-velocity stream redirects the larger stream by interference. The manner in which this is done interrupts any swirl created for the fluid and results in significant energy losses for the fluid stream entering the combustion chamber.

U.S. Pat. No. 5,309,880 issued May 10, 1994 to Mazzella et al. discloses a dual intake port in a multi-cylinder reciprocating internal combustion engine (see FIGS. 1 and 2). The intake port consists of primary and secondary port passages, 22 and 24, respectively, that interface the stem of each intake valve of the engine. The dual port passages are parallel to each other and approach the intake port zone from a common direction at substantially right angles. While each of the primary and secondary port passages are oriented in tangential relationship to the valve stem 16, the flow pattern created for the fuel-air mixture passing through the passages (when the secondary throttle valve is open) is neither symmetrical nor in the form of a helical swirling action thereby resulting in energy loss to the fuel injection system.

SUMMARY OF THE INVENTION

In accordance with the invention, an induction system and method for the passage of a fluid, typically a mixture of fuel and air, in an internal combustion engine is provided. The system comprises a cylinder head having at least one intake port communicating with at least one combustion chamber via a valve seat disposed about the intake port, and at least one intake valve provided with a valve head having a valve face engageable with the valve seat. The valve head is connected to an elongate valve stem that is mounted in the cylinder head for controlling the intermittent flow of fluid from the intake port to the combustion chamber. The system also includes a first and second flow passage that tangentially converges with the intake port about the valve stem, preferably at acute angles thereto and from substantially opposite directions, for setting in motion a balanced and complementary swirl of the fluid about the valve stem in a clockwise or counterclockwise direction towards said combustion chamber.

In accordance with another aspect of the invention, a method for inducting a swirling flow of fluid into the combustion chamber of an internal combustion engine is provided. The method comprises providing a cylinder head having at least one intake port communicating with at least one combustion chamber via a valve seat disposed about the intake port, and further providing at least one intake valve containing a valve head having a valve face engageable with the valve seat. The valve head is connected to an elongate valve stem that is mounted in the cylinder head for controlling the intermittent flow of fluid from the intake port to the combustion chamber. The method further comprises tangentially converging first and second flow passages with the intake port about the valve stem for setting in motion a balanced and complementary swirl of the fluid about the valve stem in a clockwise or counterclockwise direction towards the combustion chamber when the fluid is inducted through the first and second flow passages.

In both the system and method for inducting a swirling flow of fluid into the combustion chamber, the first and second flow passages converge with the intake port at acute angles, preferably at the same acute angle relative to the valve stem and preferably at substantially the same height above the valve seat which should be at least 0.6 centimeters. However, the acute angles of the flow passages need not be the same in order to accommodate various cylinder head configurations. In order to facilitate a balanced and complementary flow of the fluid about the valve stem, the first and second passages are generally disposed at least 120 degrees apart from each other at their point of convergence with the intake port when viewed normal to the valve stem, and are preferably disposed substantially opposite to each other.

If the velocities of the fluid passing through the first and second flow passages are substantially the same, the cross-sectional areas of the first and second fluid passages are preferably configured to be substantially the same at the point of their convergence with the intake port. For most spark ignition engine applications, the fluid passing through the first flow passage comprises a mixture of fuel and air, and the fluid passing through the second flow passage comprises air. The flow passage having the smallest acute angle relative to the vertical axis of the combustion chamber is preferred as the first flow passage in order to facilitate the deep filling of the combustion chamber with the mixture of fuel and air. The other flow passage having the greatest acute angle relative to the vertical axis of the combustion chamber will then be preferred as the second flow passage for conducting the flow of air therethrough to facilitate the scavenging of combustion residuals from the combustion chamber. In high performance vehicles such as those used in racing, a fuel-air mixture is typically utilized in both flow passages, and in diesel engine applications, the fluid flowing through both flow passages is air.

With the induction system and method according to the invention herein, a balanced and complementary swirl of the fluid about the valve stem of the inlet valve is set in motion with minimal disruption and kinetic energy losses for the fluid. The induction of a fuel and air mixture into the combustion chamber of an internal combustion engine in this manner offers improved combustion for realizing higher horsepower and lower fuel consumption.

BRIEF DESCRIPTION OF THE DRAWINGS

A complete understanding of the present invention may be obtained by reference to the following specification when taken in conjunction with the accompanying drawings wherein certain preferred embodiments are illustrated and wherein like numerals refer to like parts throughout.

DETAILED DESCRIPTION OF THE INVENTION AND PREFERRED EMBODIMENTS THEREOF

Throughout the following description, the preferred embodiments and examples are intended as exemplars rather than limitations on the apparatus of the present invention.

The present invention provides a system and structure for the induction is of a fluid, typically in the form of a fuel and air mixture, a mixture of fuel-air and air, or simply air, to the combustion chamber of an internal combustion engine, and specifically, a dual port induction structure for creating a balanced and complementary flow of fluid about the valve stem of an intake valve positioned within the intake port of a cylinder head to initiate a swirl of the fluid passing through the intake port into the engine's combustion chamber. The structure defined by the induction system utilizes acutely angled, convergent, tangential ducts with a common intake port for acquiring tangential fluid flow of the fluid about the valve stem. The tangential introduction of the fluid to a common intake port is designed to redirect the fluid flow around the face of the valve with a minimal loss of kinetic energy of the incoming fluid flow by reducing deflection losses normally incurred at the back side of the valve stem and valve face. By setting in motion a swirl of fluid about the valve stem and establishing a balanced and complementary swirl of the fluid as it enters the combustion chamber, the combustion characteristics of the fuel are enhanced resulting in improved engine performance.

Figure 1:
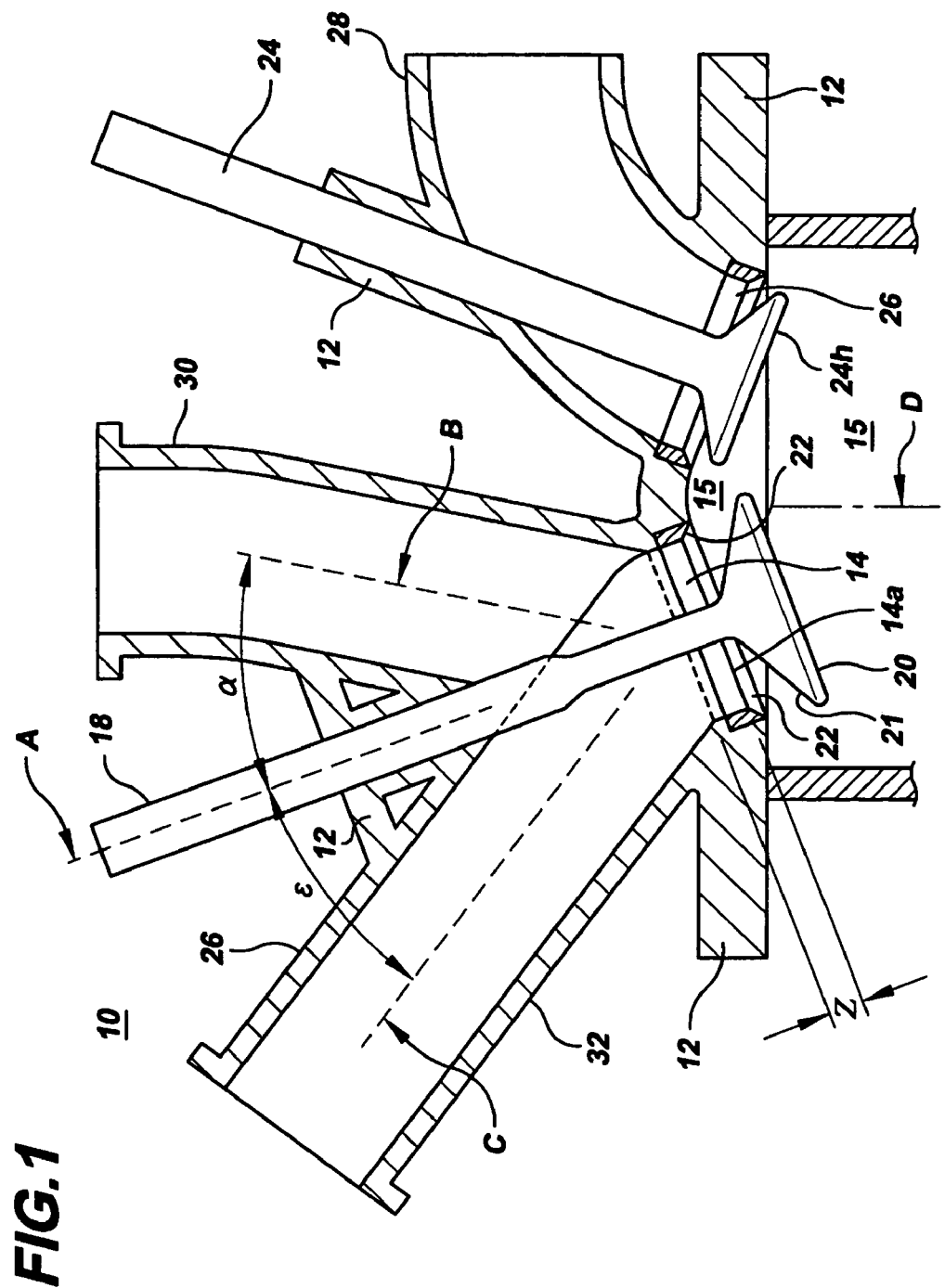
FIG. 1 is an elevated cross-sectional plan view of the cylinder head of an internal combustion engine in accordance with an embodiment of the invention.

Referring to FIG. 1, and in accordance with a preferred embodiment of the invention, an induction system 10 configured for the induction of a fluid in an internal combustion engine is illustrated which comprises a cylinder head 12 containing an inlet port 14 that interfaces with a combustion chamber 15 for receiving the reciprocal movement of an intake valve 16. Intake valve 16 is mounted within cylinder head 12 and comprises a valve stem 18 connected to a valve head 20 having a valve face 21 thereon for engaging valve seat 22 located at the exit 14a of intake port 14. Valve stem 18 is axially disposed in cylinder head 12 for reciprocation therein to open and close the exposure of intake port 14 to combustion chamber 15. The reciprocation of intake valve 16 allows for the intermittent passage of a fuel-air mixture from the intake port into combustion chamber 15. An exhaust valve 24 is also mounted in cylinder head 12 for opening and closing the exposure of exhaust port 26 to combustion chamber 12, in cooperation with intake valve 16, to allow for the exit of combustion gases from combustion chamber 12 through exhaust duct 28.

Figure 2:
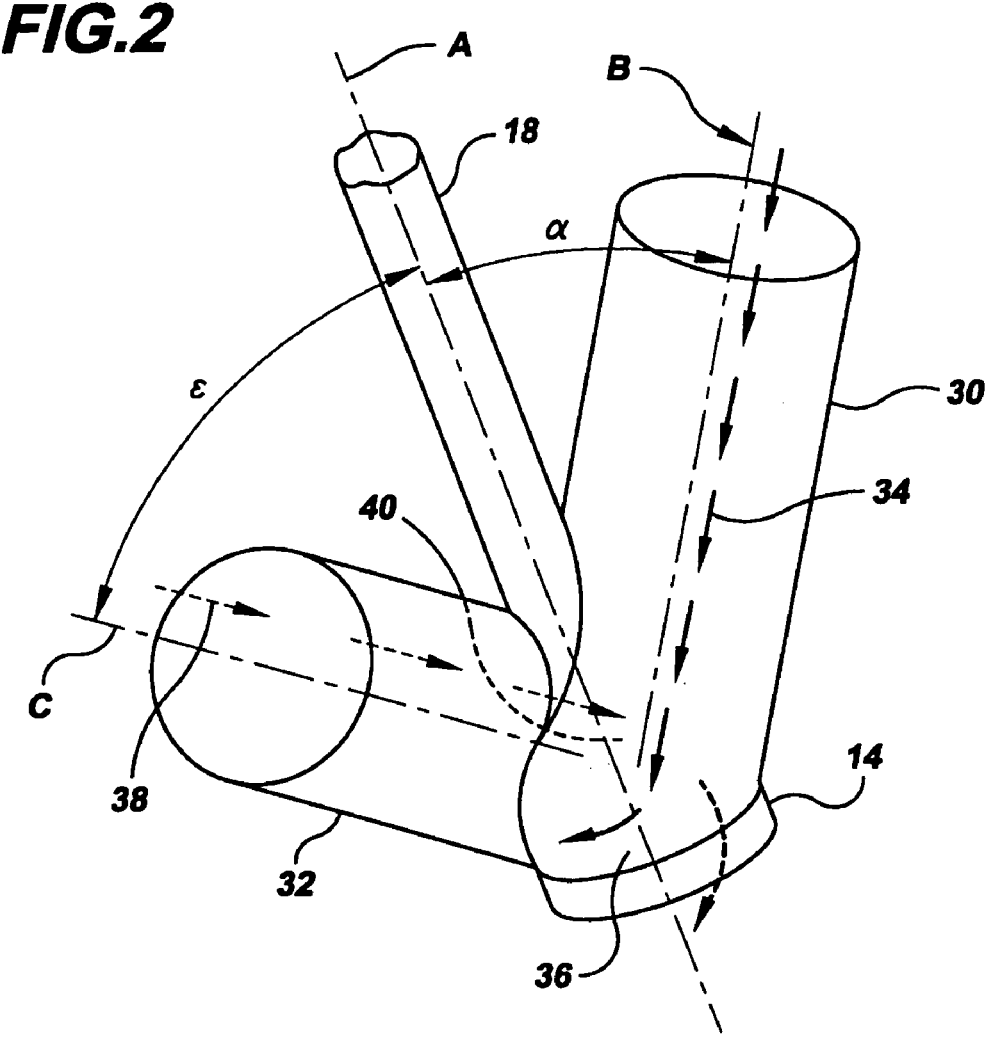
FIG. 2 is an isometric perspective view of an isolated portion of the cylinder head illustrated in FIG. 1.

As shown in FIGS. 1 and 2, induction system 10 also includes a first inlet duct 30 and a second inlet duct 32 that tangentially converge with intake port 14 about valve stem 18. The tangential convergence of first and second inlet ducts 30,32 with intake port 14 about valve stem 18 occurs at a distance $z$ above valve seat 22 thereby defining intake port 14 as a region for receiving and transporting the fluids emanating from inlet ducts 30,32 into combustion chamber 15. Accordingly, the distance $z$ does not have to be substantial in height but sufficient to accommodate the initiation of a swirl of the fluid about valve stem 18 emanating from inlet ducts 30,32, and is therefore preferably at least 0.6 centimeters in height. The convergence of each of inlet ducts 30 and 32 with intake port 14, which preferably occurs at substantially the same height z above valve seat 22, is in a downward direction so as to funnel the flow of fluids passing through intake port 14 into combustion chamber 15. The downward directional configuration of inlet ducts 30,32 with intake port 14 is defined by acute angles $q$ and $\epsilon$, respectively, relative to the longitudinal axis A of valve stem 18. Inasmuch as inlet duct 30 has a slight bend to it which is best shown in FIG. 1, for the purposes of the invention herein, axis B of inlet duct 30 and axis C of inlet duct 32 is determined at the point of the convergence of the ducts with each other about valve stem 18.

In the embodiment shown in FIGS. 1 and 2, acute angles $q$ and $\epsilon$ are substantially the same so that a symmetrical swirl of both fluids is approached when they are introduced about valve stem 18 from respective inlet ducts 30,32. By tangentially directing the fluids about valve stem 18 at an acute angle to the valve stem's longitudinal axis A, a balanced and complementary flow of each of the fluids about the valve stem is set in motion in a downward direction towards combustion chamber 15. In accordance with the invention herein, the term balanced is used to describe the substantial utilization of the space surrounding valve stem 18 by each of the respective fluids, i.e., the space surrounding valve stem 18 from the point of convergence of inlet ducts 30,32 with intake port 14 about valve stem 18 to the exit 14*a* of intake port 14. The term complementary is used to describe the condition wherein the flow of fluids emanating from each of inlet ducts 30,32 do not substantially interfere with one another, and are not significantly impeded by the presence of valve stem 18. In other words, it refers to and characterizes the fluid flow condition about valve stem 18 wherein the swirl of each of the fluids through intake port 14 and entry into combustion chamber 15 is not taken out of substantial balance.

The foregoing manner of flow is best exemplified and viewed by referring to FIG. 2, which for the purposes of clarity illustrates inlet ducts 30,32 and intake port 14 isolated from the remainder of the induction system 10 shown in FIG. 1. As fluid, e.g., a mixture of fuel and air, enters inlet duct 30, it is directed in a downward, tangential direction towards entry area 36 of the space surrounding valve stem 18. The path of the fuel-air mixture is represented by the series of arrows designated by reference number 34. Immediately after entering entry area 36, the fuel-air mixture begins its turn around valve stem 18 in a clockwise direction by following the final contours of inlet duct 30, and enters intake port 14 in the form of a downwardly spiraling swirl. Similarly, fluid, e.g., in the form of air, is introduced into inlet duct 32 and is directed in a downward direction to entry area 40 located at the opposite side of valve stem 18 and substantially opposite to entry area 36, as designated by the series of broken arrows 38. In each case, inlet ducts 30,32 are configured with intake port 14 to tangentially introduce their respective fluids around valve stem 18 in either a clockwise or counter-clockwise direction to minimize as much as possible any interference between the flows of the two fluids.

Figure 3:
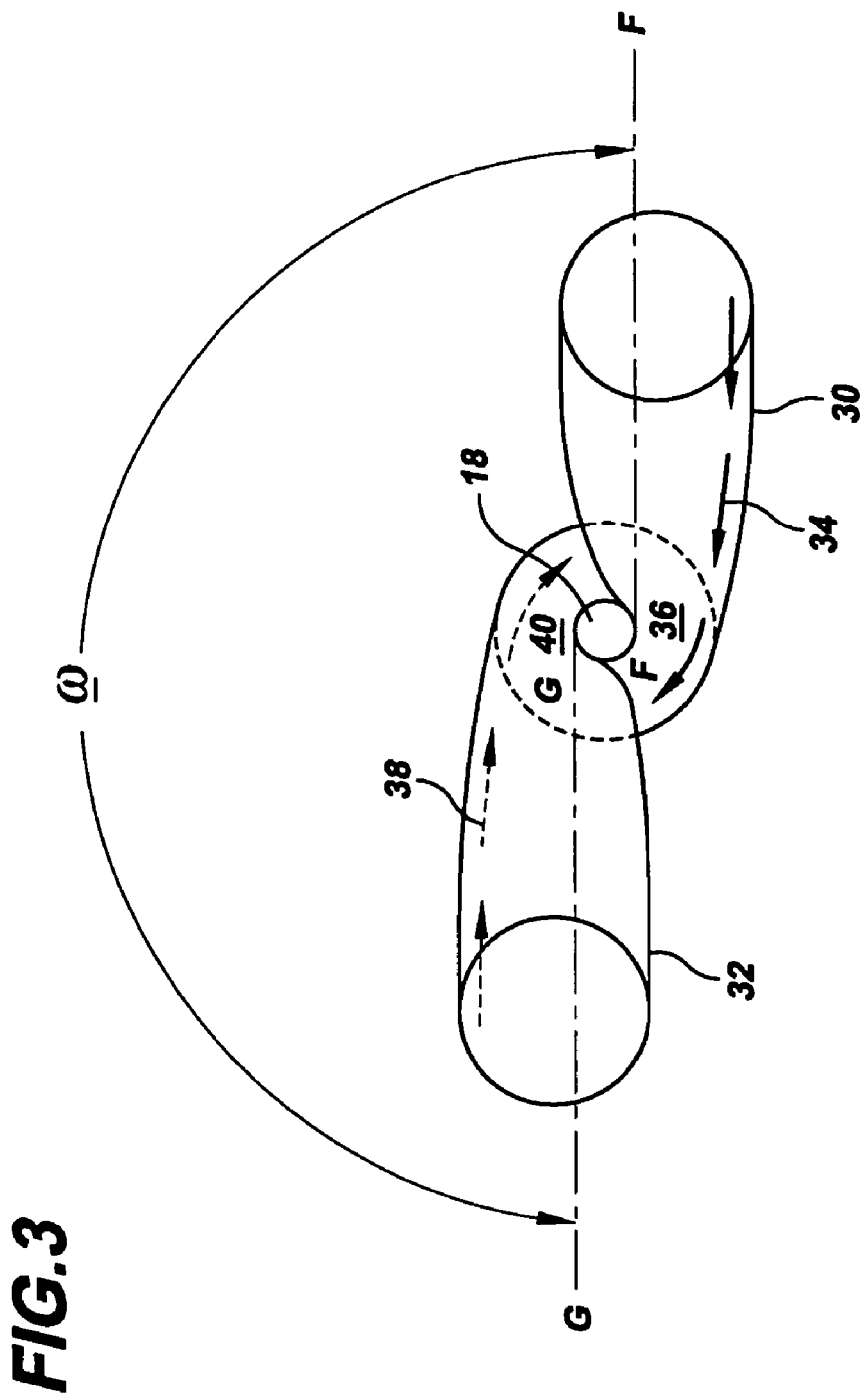
FIG. 3 is a top plan view of the cylinder head illustrated in FIG. 2.

As best shown in FIG. 3, inlet ducts 30,32 converge with intake port 14 about valve stem 18 from substantially opposite directions at an approach angle $\varphi$ between tangential approach planes represented by lines FF and GG of approximately 180° when viewed normal to valve stem 18. Inlet ducts 30 and 32 are positioned apart from one another such that the fluid introduced from inlet duct 30 into entry area 36 is substantially opposite from the fluid introduced from inlet duct 32 into entry area 40 (see also FIG. 2). The purpose of tangentially introducing the fluids at opposite sides of valve stem 18 is to utilize the entire area surrounding the valve stem for the effective initiation of swirl for each of the fluids. In doing so, any resistance or flow obstruction that may be offered by the valve stem 18 is minimized, and each of the fluids entering intake port 14 from inlet ducts 30,32 will be balanced and complementary to each other, i.e., the momentum of flow of one fluid will not distort or substantially affect the momentum of flow of the other. Flow symmetry of both fluids is therefore optimally approached when inlet ducts 30,32 converge with intake port 14 at substantially the same height above valve seat 22 from substantially opposite directions and at substantially the same acute angle relative to valve stem 18.

It will be appreciated that a given cylinder head configuration among the multiplicity of designs that are currently available may not allow inlet ducts 30 and 32 to converge about valve stem 18 from substantially opposite directions. However, if the approach angle $\varphi$ is less than 120°, then the complementation of the flow of both fluids begins to be compromised. Fluid flowing from inlet duct 30 has the possibility of impeding or interfering with the momentum of the flow of fluid from inlet duct 32, and vice-versa. The result is the inability of the fluids to remain balanced and complementary with each other for setting in motion the desired swirl about the valve stem 18. If this happens to any substantial degree, then any flow symmetry established for the fluids about valve stem 18 will be compromised. While it is possible for inlet ducts 30,32 to function with an approach angle of less than 120 degrees, it is preferred that approach angle $\varphi$ for the disposition of inlet ducts 30 and 32 relative to each other be at least 120°.

For most applications of the induction system 10 to a given cylinder head configuration, the velocity of the fluids flowing through inlet ducts 30,32 will generally be substantially the same over a broad range of engine load conditions, or if different, the velocities will be such that balance and complementation of the fluids will not be significantly altered. Accordingly, optimal flow symmetry for each of the fluids about valve stem 18 is best approached by configuring the cross-sectional areas of the inlet ducts to be substantially the same at their point of convergence with intake port 14. If the velocities of the respective fluids introduced to inlet ducts 30 and 32 are substantially different, then the cross-sectional areas of one or both of the inlet ducts 30,32 can be adjusted to promote a balanced and complementary flow of the respective fluids about valve stem 18.

Several advantages are obtained with the induction system according to the invention. In a single porting system for inducting a fluid such as a fuel-air mixture into a combustion chamber, the disruption and energy losses imparted to the fluid flow is caused by the fluid's contact with the walls of the inlet port, the flow disruptive vortices that normally occur on the blind side of the valve stem, and the subsequent impact with the corresponding valve head. These kinetic energy losses are avoided or at least substantially minimized by the tangential convergence of dual ducts about valve stem 18 since the fluids introduced into inlet ducts 30 and 32, respectively, do not impinge on the valve stem 18, and less so on the valve head 20, for entry into the combustion chamber. Because a balanced swirl of the respective fluids about the valve stem is set in motion, the inlet duct fluids are enabled to flow past valve stem 18 and valve head 20 with minimal disruption and energy losses. The fuel-air mixture introduced to entry area 36 from inlet duct 30 does not interfere with in any substantial way the air being introduced to entry area 40 by inlet duct 32. The swirl that is set in motion for each of the fluids therefore complement each for establishing a symmetry of flow during their passage through intake port 14 into combustion chamber 15.

Another significant advantage of the induction system according to the invention lies in the improved downdraft and cross-flow capabilities offered by the downward tangential convergence of inlet ducts 30,32 with intake port 14 about the valve stem. Referring once again to FIG. 1, the respective axes A and E of valve stem 18 and exhaust valve 24 are acutely angled relative to the axis D of combustion chamber 15 which is typical of hemispherical, pent roof, and wedge cylinder head type engines. If a fuel-air mixture is introduced into inlet duct 30, swirl of the fuel-air mixture will be initiated about valve stem 18 as it enters entry area 36 (see FIG. 2), and will fully develop as it passes through exit 14*a* of intake port 14 and the outside diameter of valve face 21 when intake valve 16 is fully extended into combustion chamber 15. Once the fuel-air mixture exits intake port 14, its swirl is directed towards the deepest part of combustion chamber 15 by virtue of the disposition of inlet duct 30 relative to axis D of combustion chamber 15. Because the loss of kinetic energy of the fuel-air mixture flow within intake port 14 is minimized, as discussed above, cylinder filling is enhanced by the attendant increase in momentum of the fuel-air mixture charge. Stated another way, a natural assistance to the cylinder filling process is created within intake port 14 because fluid resistance in the form of frictional losses and vortices are overcome by the tangential flow of the fluid fuel about the valve stem. The resulting swirl that is initiated about the valve stem causes a corresponding increase in the inertial charge of the fluid fuel. Consequently, inlet duct 30, by virtue of its axial disposition to the vertical axis D of combustion chamber 15, renders it as the choice for the passage of a fuel-air mixture into the deeper part of the combustion chamber. The increase in fluid energy developed within intake port 14 is therefore efficiently utilized to facilitate cylinder filling.

By applying a similar analysis, and again referring to FIG. 1, the axis C of inlet duct 32 is disposed in relationship to axis D of combustion chamber 15 at a much greater (or less acute) angle than that of inlet duct 30. If air is introduced into inlet duct 32, an air swirl will be initiated about valve stem 18 within intake port 14 as the air enters entry area 40 (FIG. 2). Like the fuel-air mixture swirl entering combustion chamber 15, the air swirl fully develops as it passes through exit 14a of intake port 14 and the outside diameter of valve face 21 (when intake valve 16 is fully extended into combustion chamber 15). However, unlike the direction that the fuel-air mixture takes, as the air exits intake port 14 past valve head 20, its swirl is directed across combustion chamber 15, towards exhaust valve 24 and exhaust port 26, for enhancing the removal or "sweeping out" of residual gases remaining from the previous combustion cycle, resulting in less unburned fuel being drawn out exhaust port 26. By virtue of its axial disposition to axis D of combustion chamber 15 (at a greater acute angle than inlet duct 30), inlet duct 32 serves as a "side-draft" or "cross-flow" duct for the introduction and passage of air into combustion chamber 15.

Inasmuch as the momentum of the airflow passing through intake port 14 and valve seat 21 will be greater as a result of the minimization of the kinetic energy losses discussed above, a shorter period of time will be necessary for "blowing down" or "scavenging" the residuals of the previous combustion cycle. Stratification of the fuel-air mixture and air fluids is also enhanced by the respective directions that each of them takes into combustion chamber 15, and propagation of the flame front originating from the spark plug (not shown) is improved. The improved air flow from inlet duct 32 through intake port 14 also allows for the configuration of smaller inlet valves and a more compact combustion chamber, which in turn allows for increased squish area in the combustion chamber 15. As is generally known, swirl action and large squish area are both well-established aids to a more complete combustion of the fuel delivered to the combustion chamber.

It will be appreciated that angles $\varphi$ and $\epsilon$ at which respective inlet ducts 30 and 32 are disposed relative to valve stem 18 can be varied depending on the configuration of the cylinder head and the disposition of inlet valve 20 relative to combustion chamber 15. For example, once again referring to FIG. 1, if the cylinder head configuration dictates that valve head 20 of inlet valve 16 is substantially perpendicular to combustion chamber 15, i.e., if axis A of valve stem 18 approaches a very acute angle that renders it substantially parallel with, or near parallel to, the vertical axis D of combustion chamber 15, then the disposition of inlet ducts 30 and 32 relative to valve stem 18 can be adjusted to comport with $\varphi$ and $\epsilon$ angles that provide optimum deep filling and cross-flow characteristics for the fluids passing from respective inlet ducts 30,32 into combustion chamber 15. In this case, the value of $\varphi$ will be less than the value of $\epsilon$, and inlet duct 30 will be disposed at more of an acute angle to valve stem 18 than inlet duct 32. Because of the disposition of inlet duct 30 relative to axis D of combustion chamber 15, it, rather than inlet duct 32, becomes the choice for transporting the fuel-air mixture for enhancing the deep filling of combustion chamber 15. The axial disposition of inlet duct 32 with axis D of combustion chamber 15 enhances the removal of residual gases remaining from the previous combustion cycle. Furthermore, by virtue of the tangential convergence of each of the fluids about valve stem 18, their balanced and complementary flow properties established within intake port 14 are substantially maintained.

The design variable for adjusting the angles at which inlet ducts 30,32 converge about valve stem 18 offers a wide degree of flexibility for not only improving and adjusting fluid flow about the intake valve stem in a way that approaches symmetry for the two fluids, but also lends itself for optimizing deep cylinder filling and cross-flow properties within the combustion chamber. The induction system according to the invention can therefore be incorporated with a variety of cylinder head configurations since it combines the benefits of both "crossflow" and "downdraft" cylinder heads into one design, along with better swirl combustion than existing practices.

Figure 4:
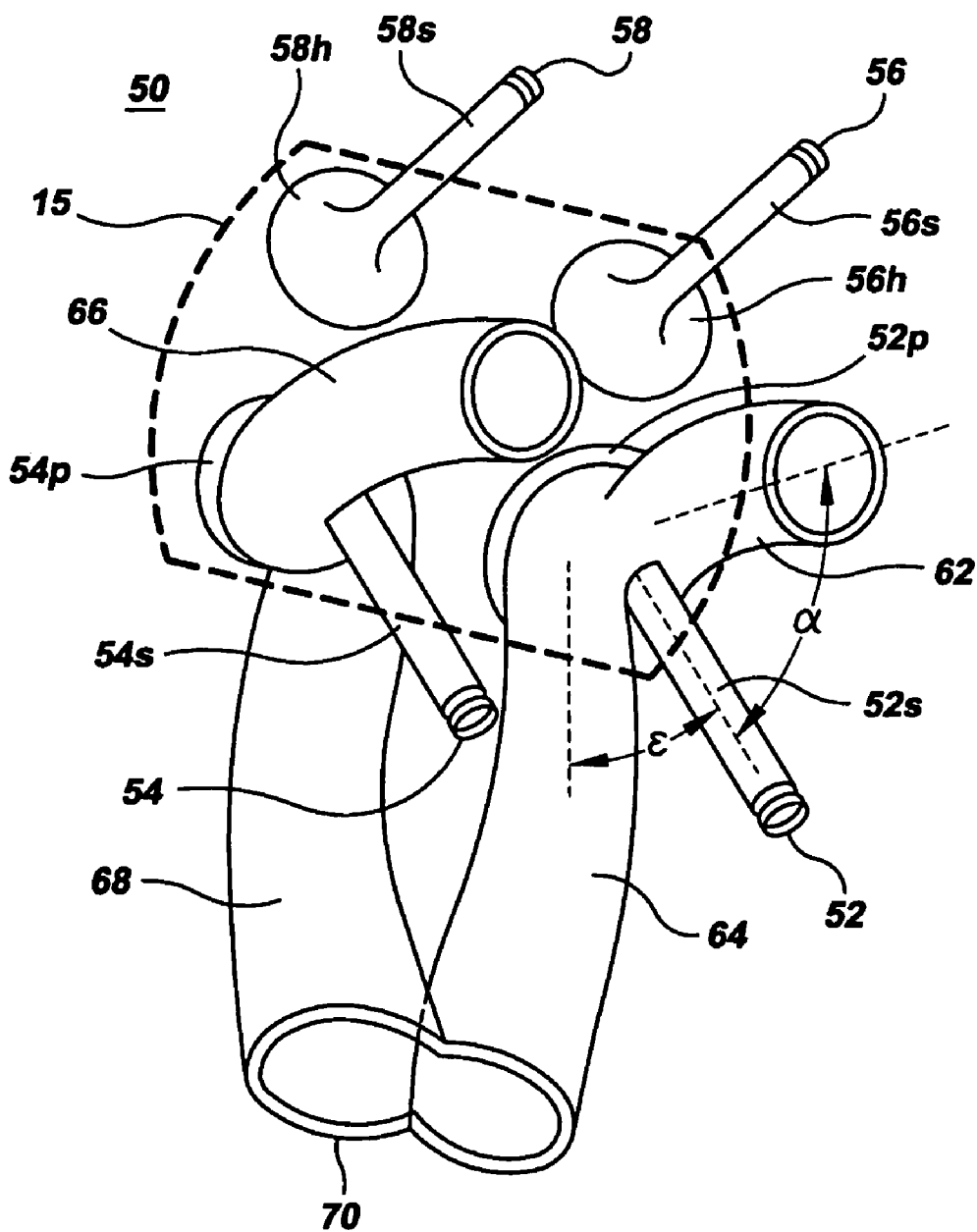
FIG. 4 is an isometric perspective view of a cylinder head in accordance with another embodiment of the invention.

In accordance with another aspect of the invention, FIG. 4 illustrates the application of the induction system 10 in FIG. 1 to a standard, 40 degree, four-valve per cylinder, cylinder head 50. Typically, cylinder head 50 comprises four combustion chambers and a corresponding pair of intake ports and inlet valves per combustion chamber for use in an automotive internal combustion engine. The relevant features of cylinder head 50 according to the invention comprise a pair of intake valves 52 and 54 and a corresponding pair of exhaust valves 56 and 58 having corresponding valve stems 52s,54s,56s,58s. The valve heads (not shown) of intake valves 52 and 54, and the respective valve heads 56h and 58h of exhaust valves 56, 58 interface combustion chamber 15 (as outlined in bold dashed lines) in the same manner illustrated for valve heads 20 and 24h in FIG. 1. Tangentially converging about valve stem 52s in a downward direction with a corresponding intake port 52p is inlet duct 62 and inlet duct 64. In similar fashion, inlet duct 66 and inlet duct 68 tangentially converge about valve stem 54s with its corresponding intake port 54p. With the exception explained below, the convergence of inlet ducts 62,66 and 66,68 with their corresponding intake ports 52p,54p about their respective valve stems 52s,54s is at the respective corresponding angles $\varphi$ and $\epsilon$ shown in FIG. 1. It will be understood that these angles can vary for inlet ducts 62,64 and 66,68 depending on the cylinder head configuration for a given internal combustion engine.

Figure 5:
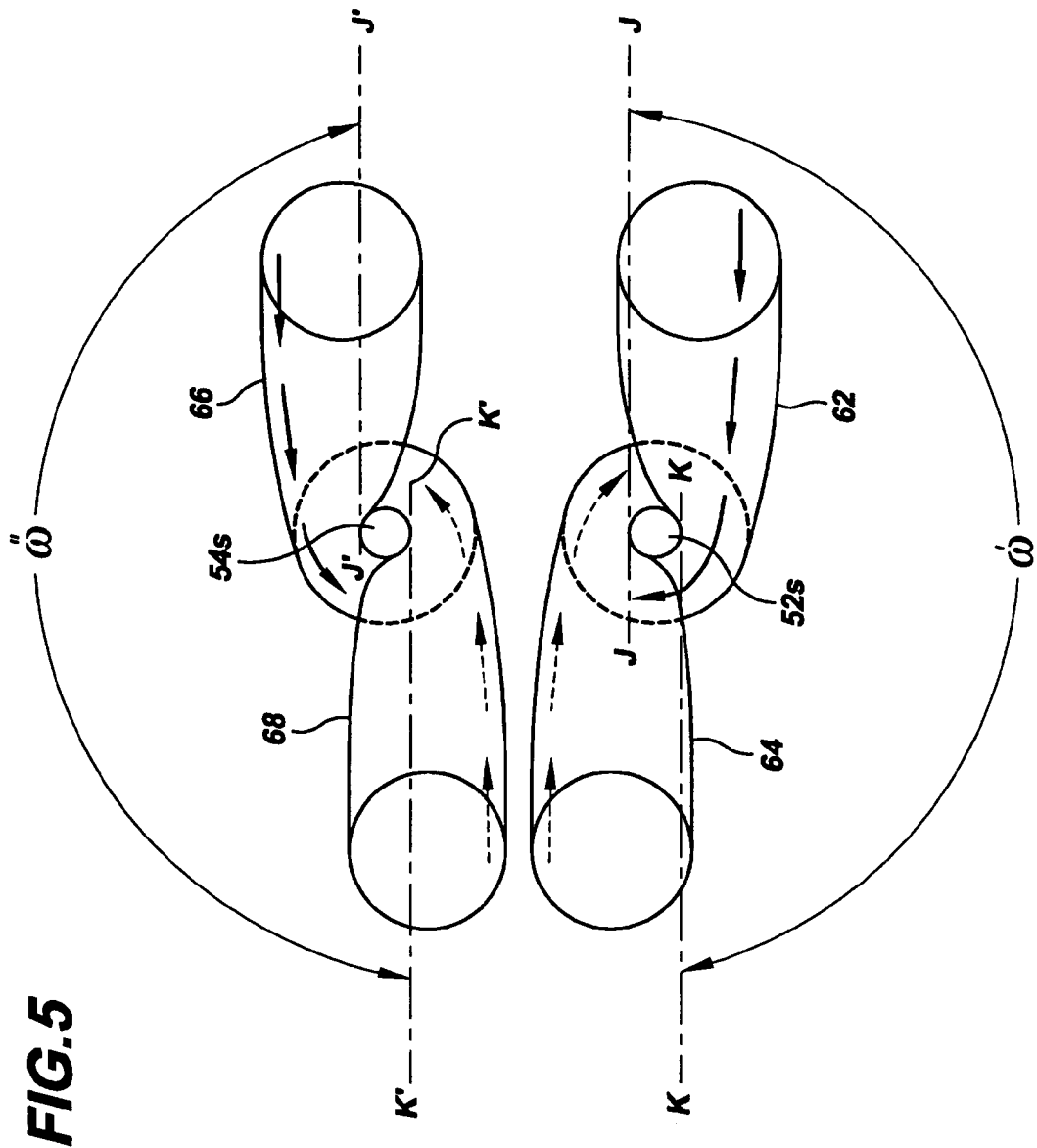
FIG. 5 is a top plan view of an isolated portion of the cylinder head illustrated in FIG. 4.

As shown in FIG. 5, each of inlet ducts 62,64 and 66,68 approach their respective valve stems 52s,54s from substantially opposite directions, i.e., at about 180° apart from each other as defined by approach angles $\omega$ and $\varphi$ between tangential approach planes represented by respective lines JJ,KK and J'J',K'K'. The respective approach angles $\omega$ and $\varphi$ can vary depending on the given configuration for the cylinder head of the engine. The value for approach angles $\omega$ and $\varphi$ is preferred to be at least 120° for the reasons that have been explained hereinbefore. Inlet ducts 64 and 68 are joined upstream of their convergence with their respective intake ports thereby defining common duct 70, and share the passage of the same fluid, typically air. The bifurcation of common duct 70 into inlet ducts 64 and 68 is such that inlet ducts 64,68 have substantially the same cross-sectional area for dividing the flow of air equally to their respective intake ports 52p,54p. In the illustration shown in FIGS. 4 and 5, all of the inlet ducts have substantially the same cross-sectional area for promoting a balanced and complementary flow of the fluids about their respective valve stems and into their corresponding intake ports.

As best illustrated in FIG. 5 which shows the convergence of the inlet ducts about their respective valve stems when viewed normal to the valve stems, the convergence of inlet ducts 62,64 about valve stem 52s is such that the fluids entering intake port 52p are in a clockwise direction. Conversely, the fluids flowing through inlet ducts 66,68 converge about valve stem 54s and enter intake port 54p in a counter-clockwise direction. As a result, the swirl pattern of the fluid flows emerging from intake ports 52p and 54p into combustion chamber 15 is complementary to the other, thereby assisting in cylinder filling and exhaust scavenging of the respective fluids.

The use of tangentially converging inlet ducts about the intake valve stems of a cylinder head combines the benefits of both "downdraft" and "cross flow" cylinder heads into one design and simultaneously provides improved swirl and combustion over existing practices. The improved cylinder filling afforded by the induction system according to the invention therefore allows for the design of a smaller and lighter engine since performance will be improved across the entire RPM range of the engine. Also, the improved low-end torque allows for the use of a small displacement engine in most applications. With the vehicle in a relatively constant RPM mode, as experienced in highway driving, the same engine can be geared for relatively low engine speeds. The result is a reduction of displacement per mile accompanied by a reduction in pumping and frictional losses and an improvement in both gasoline mileage and a reduction of pollution. When higher power is needed, the added inertial charge to the fluid caused by the improved flow characteristics of the induction system herein allows the engine to "breathe" more freely at higher RPM. The improvements in combustion and charge stratification also translate to greater power, higher efficiency, and lower pollution.

The induction system according to the invention herein is applicable to any gasoline or diesel internal combustion engine and is beneficially used with any type of cylinder head arrangement.

Since other modifications and changes may be varied to fit the particular operating requirements and environments of the invention, which will be apparent to those skilled in the art, the invention is not considered to be limited to the embodiments chosen for purposes of disclosure, and covers all changes and modifications which do not constitute departures from the true spirit and scope thereof.

What is claimed is:

1. An inlet port induction system in an internal combustion engine, comprising
   (a) a cylinder head having at least one intake port communicating with at least one combustion chamber via a valve seat disposed about said intake port;
   (b) at least one intake valve provided with a valve head having a valve face engageable with said valve seat, said valve head being connected to an elongate valve stem that is mounted in said cylinder head for controlling the intermittent flow of a first and second fluid from said intake port to said combustion chamber; and
   (c) a first flow passage for conducting said first fluid; and
   (d) a second flow passage for conducting said second fluid;

said first and second flow passages tangentially converging with said intake port about said valve stem at acute angles relative to the longitudinal axis of the valve stem and at least 120 degrees apart from each other at their point of convergence with said intake port, for initiating a balanced and complementary flow of said first and second fluids about the valve stem in a clockwise or counterclockwise direction towards said combustion chamber.

2. The system according to claim 1 wherein the first and second flow passages tangentially converge with said intake port at substantially the same angle.

3. The system according to claim 1 wherein the first flow passage tangentially converges with said intake port at an angle less than the angle at which the second flow passage tangentially converges with said intake port.

4. The system according to claim 1 wherein the first and second flow passages are disposed substantially opposite to each other when viewed normal to the valve stem.

5. The system according to claim 1 wherein the first and second flow passages converge with said intake port at substantially the same height above the valve seat.

6. The system according to claim 1 wherein the first and second flow passages converge about said intake port at least about 0.6 cm above the valve seat.

7. The system according to claim 1 wherein the cylinder head of the internal combustion engine comprises a plurality of combustion chambers, each communicating with a first and second intake port and a corresponding first and second intake valve, wherein the first and second flow passages converging about the valve stem of the first intake valve causes the fluids flowing therethrough to be in a clockwise direction, and the first and second flow passages converging about the valve stem of the second intake valve causes the fluids flowing therethrough to be in a counter-clockwise direction, the flow of said fluids exiting said first and second intake ports being substantially complementary to each other as they enter the combustion chamber.

8. The system according to claim 7 wherein the cylinder head comprises four combustion chambers and a corresponding pair of intake ports and inlet valves per combustion chamber.

9. A method for the induction of a flow of fluid into the combustion chamber of an internal combustion engine, comprising
   (a) providing a cylinder head having at least one intake port communicating with at least one combustion chamber via a valve seat disposed about said intake port;
   (b) providing at least one intake valve containing a valve head having a valve face engageable with said valve seat, said valve head being connected to an elongate valve stem that is mounted in said cylinder head for controlling the intermittent flow of a first and second fluid from said intake port to said combustion chamber; and
   (c) tangentially converging first and second flow passages with said intake port about the valve stem at acute angles relative to the longitudinal axis of the valve stem and at least 120 degrees apart from each other at their point of convergence with said intake port, for initiating a balanced and complementary flow of the first and second fluid about the valve stem in a clockwise or counterclockwise direction towards the combustion chamber when said first and second fluids are inducted through their respective first and second flow passages.

10. The method according to claim 9 wherein the first and second flow passages tangentially converge with said intake port at substantially the same angle.

11. The method according to claim 9 wherein the first flow passage tangentially converges about the valve stem at an angle less than the angle at which the second flow passage tangentially converges about the valve stem.

12. The method according to claim 9 wherein the first and second flow passages are disposed substantially opposite to each other when viewed normal to the valve stem.

13. The method according to claim 9 wherein the first and second flow passages converge with said intake port at substantially the same height above the valve seat.

14. The method according to claim 9 wherein the first and second flow passages converge with said intake port at least about 0.6 cm above the valve seat.

15. The method according to claim 9 wherein the cylinder head of the internal combustion engine comprises a plurality of combustion chambers, each communicating with a first and second intake port and a corresponding first and second intake valve, wherein the first and second flow passages about the valve stem of the first intake valve causes the fluids flowing therethrough to be in a clockwise direction, and the first and second flow passages about the valve stem of the second intake valve causes the fluid flowing therethrough to be in a counter-clockwise direction, the flow of said fluids exiting said first and second intake ports being complementary to each other as they enter the combustion chamber.

16. The method according to claim 15 wherein the cylinder head comprises four combustion chambers and a corresponding pair of intake ports and inlet valves per combustion chamber.

17. The method according to claim 9 wherein the first fluid is a fuel-air mixture.

18. The method according to claim 9 wherein the second fluid is air.

19. The method according to claim 9 wherein the fluid passing through the first flow passage comprises a fuel-air mixture and the fluid passing through the second flow passage comprises air.

20. The method according to claim 9 wherein the fluid flow passage having the smallest acute angle relative to the vertical axis of the combustion chamber conducts the flow of a fuel-air mixture for facilitating the deep filling of the combustion chamber, and the other flow passage conducts the flow of air to facilitate the scavenging of combustion residuals from the combustion chamber.

21. The method according to claim 9 wherein the cross-sectional areas of the first and second flow passages are substantially the same at the point of their convergence with said intake port.

22. An inlet port induction system for the passage of a fluid in an internal combustion engine, comprising
(a) a cylinder head having at least one intake port communicating with at least one combustion chamber via a valve seat disposed about said intake port;
(b) at least one intake valve provided with a valve head having a valve face engageable with said valve seat, said valve head being connected to an elongate valve stem that is mounted in said cylinder head for controlling the intermittent flow of a first and second fluid from said intake port to said combustion chamber; and
(c) a first and second flow passage for respectively conducting said first and second fluids therethrough, each flow passage tangentially converging with said intake port about said valve stem at an acute angle relative to the valve stem from substantially opposite directions and at least about 0.6 cm above said valve seat, for initiating a balanced and complementary flow of said fluid about said valve stem for establishing swirl of said fluids in said combustion chamber.

23. The system according to claim 22 wherein the first flow passage tangentially converges with said intake port at an angle less than the angle at which the second flow passage tangentially converges with said intake port.

24. The system according to claim 22 wherein the first and second flow passages are disposed at least 120 degrees apart from each other at their point of convergence with said intake port.

25. The system according to claim 22 wherein the first and second flow passages converge with said intake port at substantially the same height above said valve seat.

26. The system according to claim 22 wherein the cross-sectional areas of the first and second flow passages are substantially the same at the point of their convergence with the intake port.

27. An inlet port induction system in an internal combustion engine, comprising
(a) a cylinder head having a first and second intake port communicating with a combustion chamber via a corresponding first and second valve seat respectively disposed about said first and second intake ports;
(b) a first and second intake valve provided with a corresponding first and second a valve head, each having a corresponding first and second valve face engageable with its corresponding first and second valve seat, said first and second valve heads being connected to corresponding first and second elongate valve stems that are mounted in said cylinder head for controlling the intermittent flow of a first and second fluid from its corresponding first and second intake port to said combustion chamber;
(c) said first intake port having first and second flow passages for respectively conducting said first and second fluids therethrough, said first and second flow passages of said first intake port tangentially converging with said first intake port about said first valve stem at acute angles relative to said first valve stem and at least 120 degrees apart from each other at their point of convergence with said first intake port, for initiating a balanced and complementary flow of said fluid about the first valve stem in a downward clockwise direction; and
(d) said second intake port having first and second flow passages for respectively conducting said first and second fluids therethrough, said first and second flow passes of said second intake port tangentially converging with said second intake port about said second valve stem at acute angles relative to said second valve stem and at least 120 degrees apart from each other at their point of convergence with said second intake port, for initiating a balanced and complementary flow of said fluid about the second valve stem in a downward counter-clockwise direction;
the flow of said first and second fluids exiting said first and second intake ports being substantially complementary to each other as they enter the combustion chamber.

28. The system according to claim 27 wherein the first and second flow passages tangentially converge with their respective first and second intake ports at substantially the same angle.

29. The system according to claim 27 wherein the first flow passages tangentially converge with said first intake ports at an angle less than the angle at which the second flow passages tangentially converge with said second intake ports.

30. The system according to claim 27 wherein the first and second flow passages for the first and second intake ports are disposed substantially opposite to each other when viewed normal to their corresponding valve stems.

31. The system according to claim 27 wherein the first and second flow passages converge with their corresponding first and second intake ports at substantially the same height above the first and second valve seats.

32. The system according to claim 27 wherein the first and second flow passages converge with their corresponding first and second intake ports at least about 0.6 cm above their first and second valve seats.

33. The system according to claim 27 wherein the cylinder head comprises four combustion chambers and corresponding first and second intake ports and inlet valves per combustion chamber.

34. The system according to claims 1, 22 or 27 wherein the first fluid is a fuel-air mixture.

35. The system according to claims 1, 22 or 27 wherein the second fluid is air.

36. The system according to claim 1, 22 or 27 wherein the fluid passing through the first flow passage comprises a mixture of fuel and air, and the fluid passing through the second flow passage comprises air.

37. The system according to claim 1, 22 or 27 wherein the flow passage having the smallest acute angle relative to the vertical axis of the combustion chamber conducts the flow of a fuel-air mixture for facilitating the deep filling of the combustion chamber, and the other flow passage conducts the flow of air to facilitate the scavenging of combustion residuals from the combustion chamber.

38. The system according to claim 1, 22 or 27 wherein the cross-sectional areas of the first and second fluid passages are substantially the same at the point of their convergence with their respective intake port.

* * * * *